March 2, 1954  C. J. LONG  2,670,992
LAWN SPRINKLER
Filed Aug. 5, 1950

INVENTOR.
CHARLES J. LONG
BY
ATTORNEYS

Patented Mar. 2, 1954

2,670,992

UNITED STATES PATENT OFFICE 2,670,992

LAWN SPRINKLER

Charles J. Long, Hornell, N. Y.

Application August 5, 1950, Serial No. 177,881

3 Claims. (Cl. 299—67)

This invention relates to improvements in lawn sprinklers.

It is an object of the instant invention to give highly decorative characteristics to lawn sprinklers.

A further object is to provide a sprinkler in which the area from the sprinkler outwardly for considerable distance is uniformly wetted.

Another object is to form a sprinkler of sturdy construction and reasonably free from maintenance costs.

Other objects of the instant invention will become apparent in the course of the following specification.

In the attainment of these objectives, the lawn sprinkler is constituted of a decorative hollow figure simulative of a cowboy or the like mounted upon a turn table actuated by the water. In the upraised hand of the hollow figure is a rotatably mounted lariat also actuated by the water. The dual rotary motion of the body and lariat provide a sprinkler which evenly distributes the water over a substantial area from the base of the figure.

The invention will appear more clearly when taken in conjunction with the accompanying drawings showing by way of example a preferred embodiment of the inventive idea.

Figure 1:
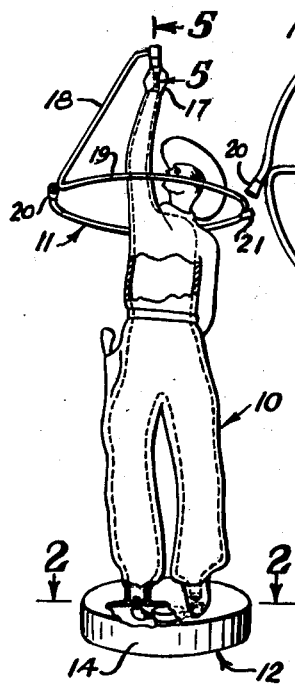
Figure 1 is a perspective view of the lawn sprinkler with lariat constructed in accordance with the principles of this invention.
Figure 4:
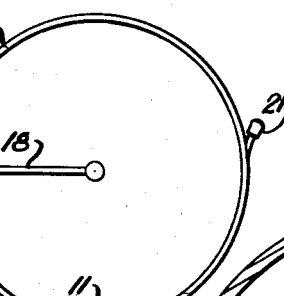
Figure 4 is a plan view of the lariat shown in Figure 1, and enlarged.

Referring now in greater detail to the drawings where like reference numerals indicate like parts, reference numeral 10 indicates the figure of the cowboy, 11 the lariat, 12 the pedestal, and 13 the turntable.

Figure 3:
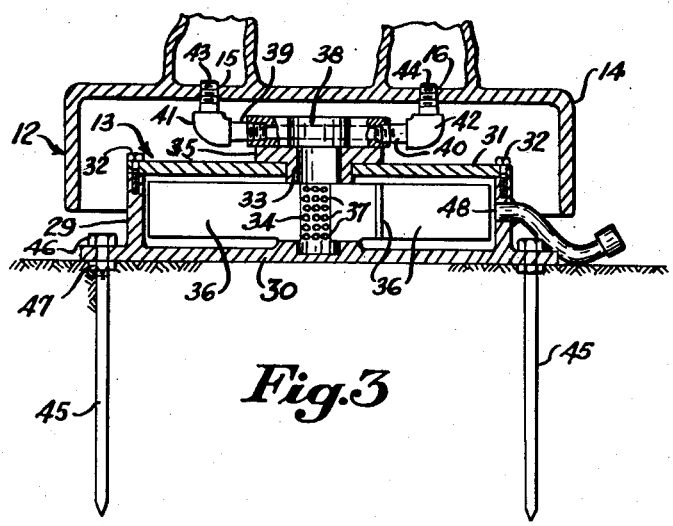
Figure 3 is a sectional view along 3—3 of Figure 2.

The figure 10 is hollow formed from any suitable material. The pedestal 12 is likewise hollow formed and has a downwardly directed integrally formed rim 14. The figure and pedestal may be integrally formed but in any event the pedestal has two internally threaded openings or inlets 15 and 16 (Fig. 3) leading to the interior of the hollow body.

In the upraised hand 17 of the figure is the lariat 11 formed from a continuous tube having a top section 18 leading downwardly from the hand and horizontal section 19 encircling the body of the cowboy.

Figure 5:
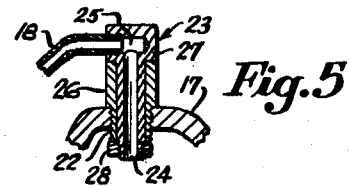
Figure 5 is a sectional view along 5—5 of Figure 1.
Figure 2:
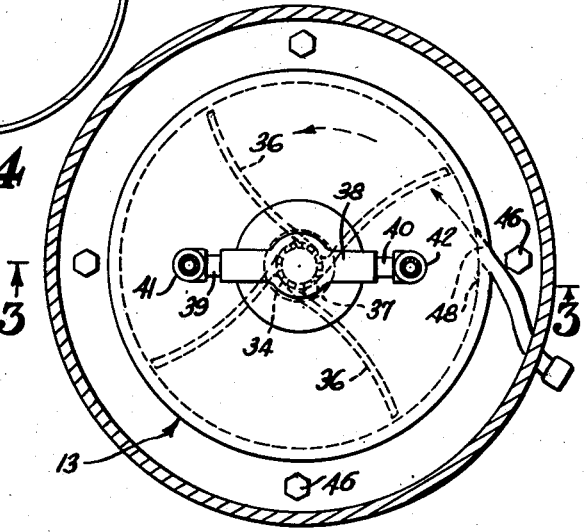
Figure 2 is a sectional view along 2—2 of Figure 1 but on an enlarged scale.

Spaced apart substantially 180° in the horizontal portion 19 are the oppositely directed outlets 20 and 21. In the upraised hand 17 is a threaded opening or outlet 22 (Fig. 5) for the rotatable attachment of the lariat to the hand. The rotatable attachment is made with a downwardly directed member 23 having a longitudinal opening 24 communicating with a transverse opening 25 into which the end of the top section 18 of the lariat is inserted to form a continuous passageway through the hand and lariat. Rotatably disposed around the member 23 is a sleeve 26, externally threaded below the enlarged head 27 of the member 23 to coact with the internally threaded opening 22 in the hand. The member 23 and sleeve 26 are prevented from moving longitudinally by the nut 28 threaded in the free end of the member 23.

The turn table 13 may be a cylindrical casing as illustrated having the upwardly directed wall 29 (Fig. 3) formed integral with a base member 30 which protrudes beyond the wall as illustrated. Over the open top of the casing is a cover member 31 removably secured to the upper rim of the wall by any suitable fasteners 32. At the center of the cover member is an opening 33. Rotatably inserted through the opening 33 is a hollow shaft 34 one end of which is journaled in the base member 30 as illustrated with the opposite end extending above the cover member. The rotatable insertion of the shaft through the cover may be made water tight by any suitable bearing 35 together with packing (not shown) where necessary. Radially disposed on the hollow shaft 34 are the spaced fins 36 of arcuate form. Through the hollow shaft 34 and between the fins are a plurality of openings 37 forming passageways between the interior of the casing and the shaft and the figure as later shown.

The pedestal 12 is mounted on the free end of the hollow shaft 34 in the following manner:

A "T-connector" 38 is attached to the free end of the shaft. Into each horizontal branch of the "T-connector" the nipples 39 and 40 are threaded. On the free end of each nipple are threaded the 90° turn connectors 41 and 42 respectively. Between the free ends of the 90° connectors and the threaded openings 15 and 16 through the pedestal 12 and leading into the hollow feet of the figure are the nipples 43 and 44.

To lend stability to the sprinkler, spaced openings are made through the extended rim of the base member 30 of the turn table and through the openings the like pins 45 are inserted and held in place by the nuts 46 and 47 threaded on the pins on opposite sides of the base member as illustrated.

In operation:

Water entering the inlet 48 is directed toward the fins 36 and escapes through the openings 37 into the hollow shaft 34; thence upwardly through the "T-connector" to divide and enter the hollow feet of the hollow body; thence upwardly in the hollow body and upraised arm to the downwardly directed member 23 and the top section 18 of the lariat 11; and thence into the horizontal portion 19 of the lariat and out of the oppositely directed outlets 20 and 21. The force of the water against the fins will cause the shaft 34 to rotate and with it the figure of the cowboy, and the force of the water escaping out of the openings in the lariat will cause the lariat to rotate also.

It will be understood that the invention is not limited to the exact disclosure herein described but may lend itself to a variety of expressions within the scope of the appended claims.

What is claimed is:

1. A water sprinkler for lawns, the sprinkler comprising a figurine, the figurine having a hand, the hand having an outlet and the figurine further having an inlet in the bottom and a passageway intermediate the inlet and the outlet, a hollow lariat of arcuate form rotatably disposed in the outlet, the lariat having at least one outlet; the sprinkler further comprising a casing, the casing having an opening formed in the top thereof, a shaft rotatably disposed through the opening in the casing, one end of the shaft extending above the casing and the opposite end extending into the casing, the shaft having formed therethrough a longitudinal opening and a plurality of transverse openings communicating with the longitudinal opening and the interior of the casing, means for supporting the figurine on the end of the shaft extending above the casing with the inlet of the figurine aligned with the longitudinal opening of the shaft, a plurality of spaced fins radially disposed on the end of the shaft extending into the casing, and means for directing water under pressure against the fins for the independent rotation of both the figurine and the lariat, the opening in the lariat being adapted to give independent rotary motion thereto in the direction of rotation of the figurine and lariat.

2. In a water sprinkler for lawns, the sprinkler having a rotatable figurine with upraised hand, and the hand having an outlet from which the water is expelled under pressure; the improvements comprising a hollow lariat for the outlet, the lariat comprising a top section extending downwardly from the hand, a horizontal section integrally formed with the top section and substantially encircling the figurine the top and horizontal sections having a continuous passageway formed therethrough, the horizontal section having formed therein at least two oppositely directed outlets spaced apart substantially 180°, and means for maintaining the lariat rotatable in the outlet, the means comprising a downwardly directed member disposed on the free end of the top section, the downwardly directed member having formed therein a passageway communicating with the passageway in the top section, a sleeve rotatably disposed around the downwardly directed member below the free end of the top section, means for removably securing the sleeve in the outlet, and means for securing the downwardly directed member against longitudinal movement in the sleeve.

3. A water sprinkler for the lawn, the sprinkler comprising a hollow figure simulative of a cowboy with feet and an upraised hand, the hand having an outlet formed therein, a hollow lariat of arcuate form rotatably disposed in the outlet, the lariat having at least one outlet and the hollow figure and lariat forming a continuous passageway, a pedestal for the figure integrally formed with the feet thereof, the pedestal having formed therein two spaced openings communicating with the hollow interior of the feet; the sprinkler further comprising a cylindrical casing with an open top and an integrally formed base member, the periphery of the base member being extended outwardly from the casing, a cover member removably disposed over the open top of the casing, the cover member having an opening formed therethrough at the center, a hollow shaft rotatably disposed through the opening in the cover member with both ends extended on opposite sides thereof, a plurality of spaced fins radially disposed on the end of the shaft in the casing; the shaft having transverse openings formed therethrough intermediate the fins, the casing further having formed therein an inlet coacting with the fins, means for connecting the protruding end of the shaft extended above the cover member to the two spaced openings in the pedestal, the means forming a bifurcated passageway from the hollow shaft to the interior of the figure, and means through the extended base member for releasably securing the casing to the lawn.

CHARLES J. LONG.

References Cited in the file of this patent

UNITED STATES PATENTS

| Number | Name | Date |
|---|---|---|
| 1,642,910 | Thompson | Sept. 20, 1927 |
| 1,939,803 | Cataldi | Dec. 19, 1933 |
| 2,046,225 | Vickery | June 30, 1936 |
| 2,241,092 | Jurgilanis | May 6, 1941 |
| 2,509,576 | Morgan | May 30, 1950 |

OTHER REFERENCES

T.-M. 352,736    Hi-Boy    Dec. 14, 1937